(12) United States Patent
Baier et al.

(10) Patent No.: US 7,675,406 B2
(45) Date of Patent: *Mar. 9, 2010

(54) GENERATION OF TIMESTAMPS WITHIN FIELD DEVICES

(75) Inventors: John J. Baier, Mentor, OH (US); Eric G. Dorgelo, Port Moody, CA (US); Kenwood H. Hall, Hudson, OH (US); Charles M. Rischar, Chardon, OH (US); David K. Johnson, Waukesha, WI (US); Dale Sapach, Roberts Creek, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 602 days.

This patent is subject to a terminal disclaimer.

(21) Appl. No.: 11/537,363

(22) Filed: Sep. 29, 2006

(65) Prior Publication Data

US 2008/0079595 A1    Apr. 3, 2008

(51) Int. Cl.
    *G08B 29/00* (2006.01)
(52) U.S. Cl. .......................... 340/506; 375/295
(58) Field of Classification Search .......... 340/506, 340/679; 375/295; 370/389, 412, 465; 707/100; 700/180; 709/218
    See application file for complete search history.

(56) References Cited

U.S. PATENT DOCUMENTS

| | | | |
|---|---|---|---|
| 5,602,749 A | 2/1997 | Vosburgh | |
| 5,754,596 A * | 5/1998 | Bischoff et al. | 375/295 |
| 5,944,840 A | 8/1999 | Lever | |
| 6,002,427 A | 12/1999 | Kipust | |
| 6,823,232 B2 * | 11/2004 | Murphy | 700/180 |
| 6,868,538 B1 | 3/2005 | Nixon et al. | |
| 7,043,728 B1 * | 5/2006 | Galpin | 718/102 |
| 7,053,770 B2 | 5/2006 | Ratiu et al. | |
| 7,155,514 B1 | 12/2006 | Milford | |
| 2002/0163932 A1 * | 11/2002 | Fischer et al. | 370/465 |
| 2003/0009711 A1 | 1/2003 | Kuhn et al. | |
| 2004/0008111 A1 | 1/2004 | Chernoguzov et al. | |
| 2005/0203927 A1 * | 9/2005 | Sull et al. | 707/100 |
| 2006/0055529 A1 | 3/2006 | Raitu et al. | |
| 2006/0119486 A1 | 6/2006 | Kim et al. | |
| 2006/0259166 A1 | 11/2006 | Hoffman et al. | |
| 2007/0226318 A1 * | 9/2007 | Rydberg et al. | 709/218 |
| 2008/0043766 A1 * | 2/2008 | Bryngelson et al. | 370/412 |
| 2008/0079595 A1 | 4/2008 | Baier et al. | |
| 2008/0079596 A1 * | 4/2008 | Baier et al. | 340/679 |

OTHER PUBLICATIONS

OA dated Jun. 12, 2009 for U.S. Appl. No. 11/537,387, 18 pages.
OA dated Feb. 5, 2009 for U.S. Appl. No. 11/537,387, 25 pages.

* cited by examiner

*Primary Examiner*—John A Tweel, Jr.
(74) *Attorney, Agent, or Firm*—Turocy & Watson LLP; William R. Walbrun

(57) ABSTRACT

A field device in an industrial environment comprises a clock that is synchronized with a clock of at least one other field device. A timestamp generator component creates a timestamp for at least one of an alarm and an event created within the field device, the timestamp accords to the synchronized time. An alarm generator component analyzes data produced and/or consumed by the field device and generates an alarm and/or event based at least in part upon the analysis.

26 Claims, 11 Drawing Sheets

GENERATION OF TIMESTAMPS WITHIN FIELD DEVICES

TECHNICAL FIELD

The claimed subject matter relates generally to alarms within an industrial setting, and, more particularly, relates to associating an alarm with a timestamp created within an industrial field device.

BACKGROUND

Due to advances in computing technology, businesses today are able to operate more efficiently when compared to substantially similar businesses only a few years ago. For example, high speed data networks enable employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, activities that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases (or web services referencing databases) that are accessible by system/process/project managers on a factory floor. For example, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

In typical control applications, alarms are generated when a process variable value lies outside a predefined expected range, when a sensed parameter lies outside an expected range, when particular user action is undertaken (such as depression of an emergency stop), and the like. These alarms provide an indication to an operator or device that an unexpected event has occurred with respect to a particular control process. In another example, alarms that are not associated with a high level of urgency can be created and logged, and may not be provided to an operator unless a more urgent, related alarm occurs. Thereafter, logs can be parsed in an effort to determine a source of failure with respect to a control process.

Conventionally, field devices produce or consume data and are monitored by a higher-level system, such as a Manufacturing Execution System (MES). These higher-level systems analyze data being produced and/or consumed on a factory floor and generate alarms if monitored data lies outside a predefined range. In large facilities, a large number of alarms can be generated in a small amount of time, wherein order of generation depends upon an order that data is received at the high-level system (which can often depend upon communication medium, length of travel of data, etc.). Thus, alarms can be generated out of a desired order and may not be associated with a precise time of an event that caused such alarm.

SUMMARY

The following presents a simplified summary of subject matter described in more detail herein in order to provide a basic understanding of some aspects of such subject matter. This summary is not an extensive overview, and is not intended to identify key/critical elements or to delineate the scope of the subject matter described herein. Its sole purpose is to present some concepts in a simplified form as a prelude to the more detailed description that is presented later.

Briefly described, the subject disclosure pertains to generating alarms within field devices and associating such alarms with timestamps that accord to a universally synchronized time. More particularly, clocks of field devices can be synchronized with one another through utilization of a master clock, which can periodically provide time updates to field devices to ensure that such devices (with different clock speeds) do not become substantially out of synch. Through utilization of the timestamps, alarms and/or events can be placed in an appropriate sequence. Additionally, the alarms and/or events can be placed in a chronologically correct order even if field devices generating the alarms and/or events are at different geographic locations (e.g., within different plants).

Thus, timestamps can be generated within devices resident upon a factory floor, wherein a plurality of devices can be synchronized to enable sequencing of alarms and/or events. Such sequencing can be utilized in connection with database reconciliation, wherein two different databases are merged with one another. Generating timestamps within field devices can improve resolution thereof, as conventionally resolution of time stamps is limited by how quickly timestamps can be pulled from a master system.

In accordance with another aspect, alarms and/or events generated within field devices can be associated with metadata that can describe the nature of an alarm and/or event, a contextual parameter relating to the alarm and/or event, an operator associated with an alarm and/or event, and other suitable data. Alarms and/or events can then be analyzed, wherein the metadata can enable a more robust analysis. Such analysis can result in determining a frequent source of an alarm, determining how to prevent occurrence of an alarm, and/or the like. The metadata can also be associated with an Enterprise Resource Planning system, such as the status of an order. Such business-related metadata can be utilized in determining severity of an alarm as well as where to deliver an alarm.

Additionally, when a severe alarm occurs and/or a system shutdown occurs, retained alarms and/or events in an appropriate sequence can be analyzed to determine where to roll back a system. In other words, a system can be rolled back to a known good state, even if the system is dispersed across several plants.

To the accomplishment of the foregoing and related ends, certain illustrative aspects are described herein in connection with the following description and the annexed drawings. These aspects are indicative, however, of but a few of the various ways in which the principles of the invention can be employed and such subject matter is intended to include all such aspects and their equivalents. Other advantages and novel features will become apparent from the following detailed description when considered in conjunction with the drawings.

DETAILED DESCRIPTION

Figure 1:
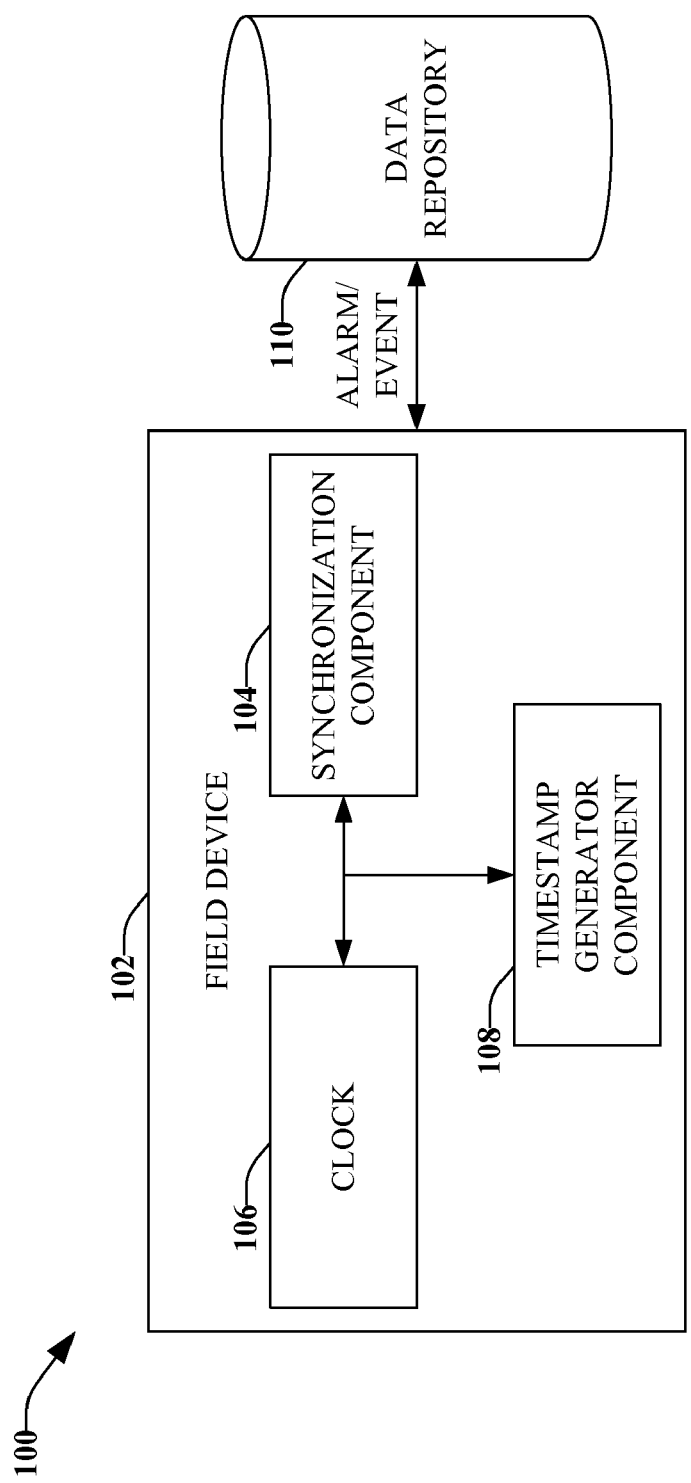
FIG. 1 is a high level block diagram of a field device that can generate an alarm and a timestamp and associate the alarm with the timestamp.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, aspects of the disclosed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates sequencing of alarms within a manufacturing environment. The system 100 includes a field device 102 within the manufacturing environment, wherein the field device 102 can be an actuator, a sensor, a controller, or other suitable device that resides on a factory floor that produces and/or consumes data. The field device 102 includes a synchronization component 104 that can synchronize a clock 106 associated with the field device 102 with clocks associated with several other field devices. Therefore, a consistent, system-wide time can exist amongst multiple field devices. In an example, a higher-level system can periodically indicate a system-wide time, and the synchronization component 104 can set the clock 106 to such system-wide time. Periodically ensuring that a synchronized time is correct is important, as clock speed of different devices can be non-identical. Therefore, different devices with different clock speeds are never substantially out of synch with one another.

The field device 102 also includes a timestamp generator component 108, which can create timestamps and associate such timestamps with alarms generated by the field device 102. As the timestamp generator component 108 is internal to the field device 102, a much more resolute time can be captured with respect to an alarm (e.g., in the order of nanoseconds of resolution). Conventionally, resolution of timestamps is limited to how quickly time stamps can be pulled. Creating time stamps through utilization of the time stamp generator component 108 within the field device 102 enables drastic improvement of resolution associated with time stamps relating to events and/or alarms associated with the field device 102.

The system 100 additionally includes a data repository 110 that can retain alarms generated by the field device 102 and timestamps associated therewith. The data repository 110 can also receive alarms generated by other devices, wherein the alarms include associated time-stamps. Thus, alarms can be accurately sequenced and/or reasoned over based upon time to correctly and precisely reconstruct a sequence of alarms. Additionally, devices in different geographic regions can be synchronized with one another through utilization of the synchronization component 104 (and similar components in other field devices) as well as a master clock (not shown). For example, time associated with a master clock can be periodically provided to several field devices, which can set an internal clock based upon the received time from the master clock. For instance, the master clock can accord to Greenwich Mean Time or other suitable time standard. As the different devices in different geographic regions can be synchronized and timestamps can be generated accurately therein, the data repository 110 can be analyzed to accurately determine a sequence of alarms and/or logged events. Additionally, database reconciliation can be undertaken through analysis of sequenced alarms and/or events.

Still further, system-wide synchronization of field device clocks and generation of timestamps within field devices can enable the field device 102 individually or a collection of field devices collectively to be rolled back to a known good state upon an alarm or series of alarms occurring. More specifically, as alarms can be associated with granular timestamps and events can be logged and associated with resolute timestamps, a correct sequence of events and/or alarms can be determined from indexing alarms/events by time within the data repository 110. Thereafter, an earliest known good state can be located, and the field device 102 and/or a system/process associated therewith can be rolled back to such determined state (e.g., prior to an occurrence of an alarm).

Figure 2:
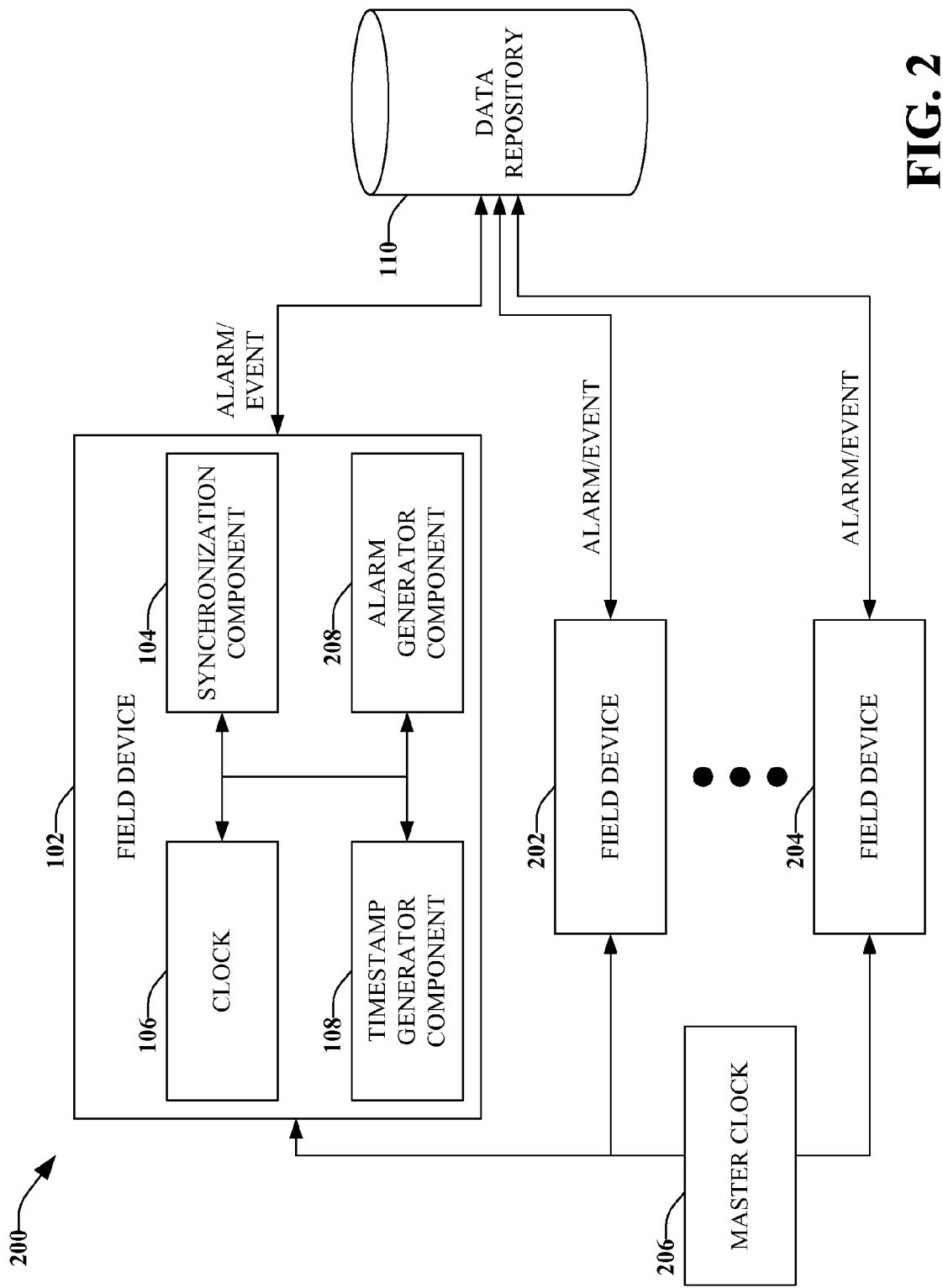
FIG. 2 illustrates a system that facilitates sequencing alarms generated from a plurality of field devices.

Now referring to FIG. 2, a system 200 that facilitates retaining a sequence of alarms and/or events is illustrated. The system 200 includes the field device 102, which can comprise the synchronization component 104 that is utilized in connection with ensuring that the clock 106 is synchronized with clocks of other field devices 202 and 204. More particularly, the synchronization component 104 can be communicatively coupled to a master clock 206, which can periodically provide indications of system time to the synchronization component 104. The synchronization component 104 can then set the clock 106 according to system time. Additionally, the field devices 202 and 204 can include synchronization components that enable clocks associated therewith to be synchronized with the clock 106 associated with the field device 102. Thus, regardless of geographical location of the field devices 102, 202, and 204, such devices can be synchronized with respect to one another.

The master clock 206 can be resident within a higher level system, such as an MES system, can be resident within a field device (e.g., a controller), or can be resident in any other suitable location. Furthermore, a hierarchical arrangement of clocks can exist, such that the clock 106 of the field device 102 acts as a master clock with respect to the clocks of the field devices 202 and 204. More particularly, the synchronization component 104 can receive an indication of time from the master clock 206, and can set the clock 106 according to such time. The field device 102 can thereafter act as a master with respect to the field devices 202 and 204, such that the synchronization component 104 provides a system time to the field devices 202 and 204. Thus, the synchronization component 104 can synchronize clocks associated with the field devices 202 and 204 with the clock 106 within the field device 102.

The field device 102 additionally includes an alarm generator component 208, which can analyze data produced or consumed by the field device 102 (and/or other devices communicatively thereto) and create an alarm based upon such analysis. For instance, the field device 102 can be associated with memory (not shown) that retains thresholds for produced and/or consumed data. If data produced/consumed by the field device 102 lies outside of a threshold, the alarm generator component 208 can create an alarm and provide it to the data repository 110 and/or a suitable industrial automation device. Additionally, the field device 102 can be communicatively coupled to legacy field devices that are unable to generate alarms, such that the alarm generator component 208 can analyze data produced and/or consumed by the legacy field devices and then generate an alarm on their behalf if such data lies outside an expected range. Thus, for instance, the field device 102 can be a network infrastructure device, such as a proxy device, a gateway, a router, a switch, or other suitable network infrastructure device that receives data from field devices.

Alarms generated by the alarm generator component 208 can be associated with timestamps created by the timestamp generator component 108, and can be provided to the data repository 110. Additionally, events logged within the field device 102 can be associated with a timestamp created by the timestamp generator component 108 and can be directed to the data repository 110. Similarly, alarms/events created within the field devices 202 and 204 can be associated with timestamps and relayed to the data repository. As clocks within the field devices 102, 202, and 204 are all synchronized with respect to time, and timestamps are generated within the field devices, alarms and/or events can be accurately organized by chronological sequence within the data repository 110. Such sequencing can be useful in analyzing efficiency of field devices and/or processes, analyzing trends, determining correlations between events and/or alarms, etc.

Figure 3:
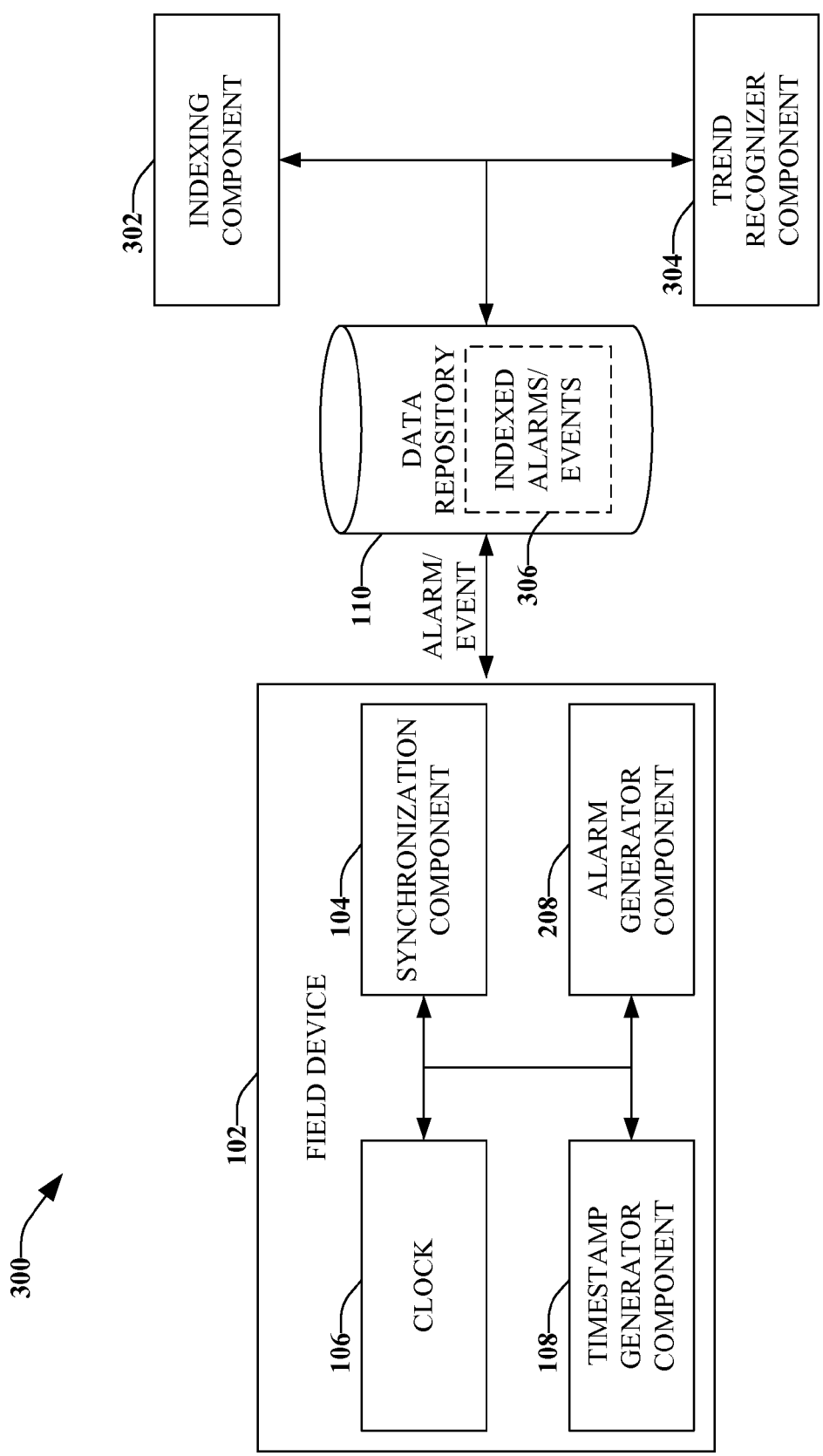
FIG. 3 illustrates a system that facilitates recognizing trends associated with a plurality of alarms.

Turning now to FIG. 3, a system 300 that facilitates indexing alarms and/or events is illustrated. The system 300 includes the field device 102, which comprises the synchronization component 104 that is employed to synchronize the clock 106 of the field device with clocks of other field devices within an industrial automation environment. As described above, time associated with the clock 106 can be a standard time, such as Greenwich Mean Time. The field device 102 additionally includes the alarm generator component 208, which can generate alarms associated with the field device 102 by analyzing data being produced and/or consumed by such device 102. The timestamp generator component 108 can create timestamps upon an occurrence of an event that brings rise to an alarm and/or upon occurrence of another suitable event, and the alarm generator component 208 can associate the timestamp with a generated alarm.

Alarms and/or events with associated timestamps can be provided to the data repository 110. An indexing component 302 that is communicatively coupled to the data repository 110 can index alarms and/or events in a manner that renders analyzing data stored therein efficient. For instance, the indexing component 302 can index alarms and/or events based upon time information associated therewith. In another example, the indexing component 302 can index alarms/events according to field device identity and time associated with alarms and/or events. In yet another example, the indexing component 302 can index alarms based upon location of field devices, alarm type/event type, operator associated with an alarm and/or event, or any other suitable parameter.

The system 300 can also include a trend recognizer component 304 that analyzes indexed alarms/events 306 within the data repository 110 and locates correlations between alarms/events therein. For instance, the trend recognizer component 304 can determine over time that a particular event is often followed in time by a certain alarm, and that such alarm gives rise to another alarm. Thus, the trend recognizer component 304 can infer that preventing the particular event may give rise to prevention of several alarms. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action.

Pursuant to another example, the trend recognizer component 304 can interact with the indexing component 302 to index alarms/events within the data repository in a certain manner, and the indexed alarms/events 306 can then be reasoned over by the trend recognizer component 304. Upon undertaking such reasoning, the indexing component 302 can alter the indexing of the alarms/events within the data repository 306, and the trend recognizer component 304 can reason over the alarms/events given the new indexing and knowledge obtained with respect to a prior indexing of the alarms/events stored within the data repository 306. Reasoning over sequenced alarms/events can enable determination of one or more events that have a probability above a certain threshold of giving rise to an alarm or other problematic issue, and countermeasures can be determined to reduce negative affects associated with the alarm. While shown as being external to the field device 102, it is understood that the data repository 110, the indexing component 302, and the trend recognizer component 304 can be internal to the field device 102.

Figure 4:
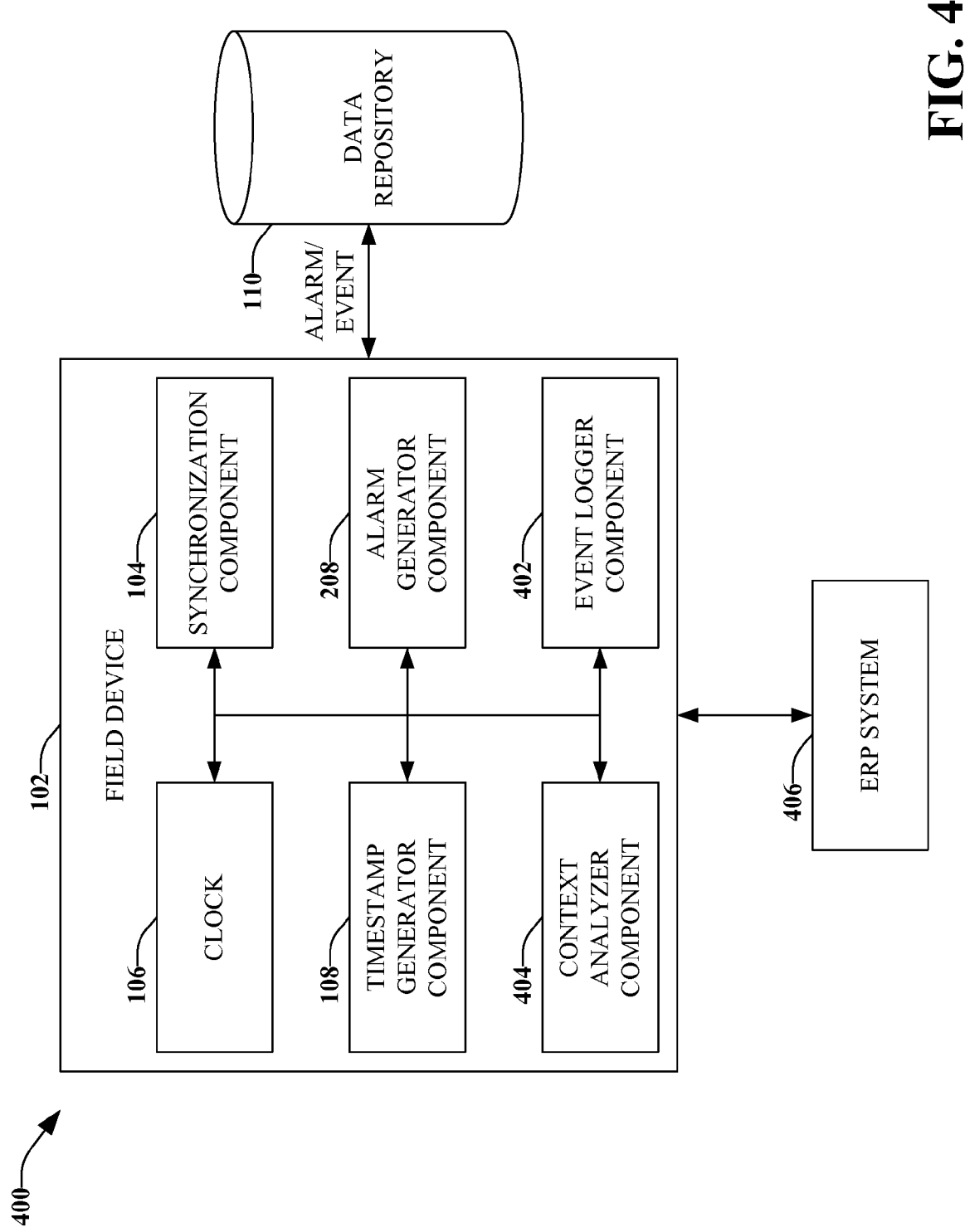
FIG. 4 illustrates a field device that can package an alarm with metadata and a timestamp.

With reference now to FIG. 4, a system 400 that facilitates generation of alarms packaged with metadata is illustrated. The system 400 includes the field device 102, which comprises the synchronization component 104. As described above, the synchronization component 104 is utilized to synchronize the clock 106 of the field device 102 with a system-wide time (and thus synchronize the clock 106 with clocks of other field devices within a manufacturing environment). The field device 102 also includes the alarm generator component 208, which creates alarms if a certain event occurs (e.g., an operator depresses an emergency stop push-button), if data produced and/or consumed by the field device 102 lies outside a desired range, etc. The alarm generator component 208 is associated with the timestamp generator component 108, such that alarms created by the alarm generator component 208 can be associated with timestamps created by the timestamp generator component 108. As the timestamps and alarms are created within the field device 102, very resolute timestamps can be associated with alarms created by the alarm generator component 208.

The field device 102 also includes an event logger component 402 that can be utilized to log predefined events and/or events that do not reach the status of an alarm. For instance, when an operator requests data associated with the field device 102 the event logger component 402 can log such request as an event. The event logger component 402 is also communicatively coupled to the timestamp generator component 108, such that logged events are associated with timestamps that accord to a system-wide time. Additionally, the alarm generator component 208 and/or the event logger component 402 can be associated with a context analyzer component 404, which can analyze current context of the field device 102, a process associated with the field device, and/or the like and provide such context to the alarm generator component 208 and/or the event logger component 402.

The context can include location of the field device 208, identity of an operator associated with the field device 102, state of a device or process, and other suitable contextual data. The alarm generator component 208 and the event logger component 402 can then package an alarm or event with certain contextual data (metadata) together with a timestamp created by the timestamp generator component 108. In a particular example, the context analyzer component 404 can analyze context associated with an Enterprise Resource Planning (ERP) system 406, and such context can be packaged with an alarm/event. For instance, context associated with the ERP system 406 can include status of orders, status of inventory, employee information, etc. Alarms and/or events created within the field device 102 can then be relayed to the data repository 110 and can be analyzed to determine patterns/trends of alarms and events. Thus, the data repository 110 includes alarms/events that can be sequenced according to timestamps associated therewith. Additionally, contextual data associated with alarms and/or events can be reviewed to determine severity of an alarm and/or the like. Pursuant to an example, the context analyzer component 404 can determine from the ERP system 406 that a product should be shipped at a point in time in the near future. The context analyzer component 404 can pass such information to the alarm generator component 208, which can generate an alarm of high severity if a problem in manufacturing the product arises (causing at least temporary cessation of manufacture).

Figure 5:
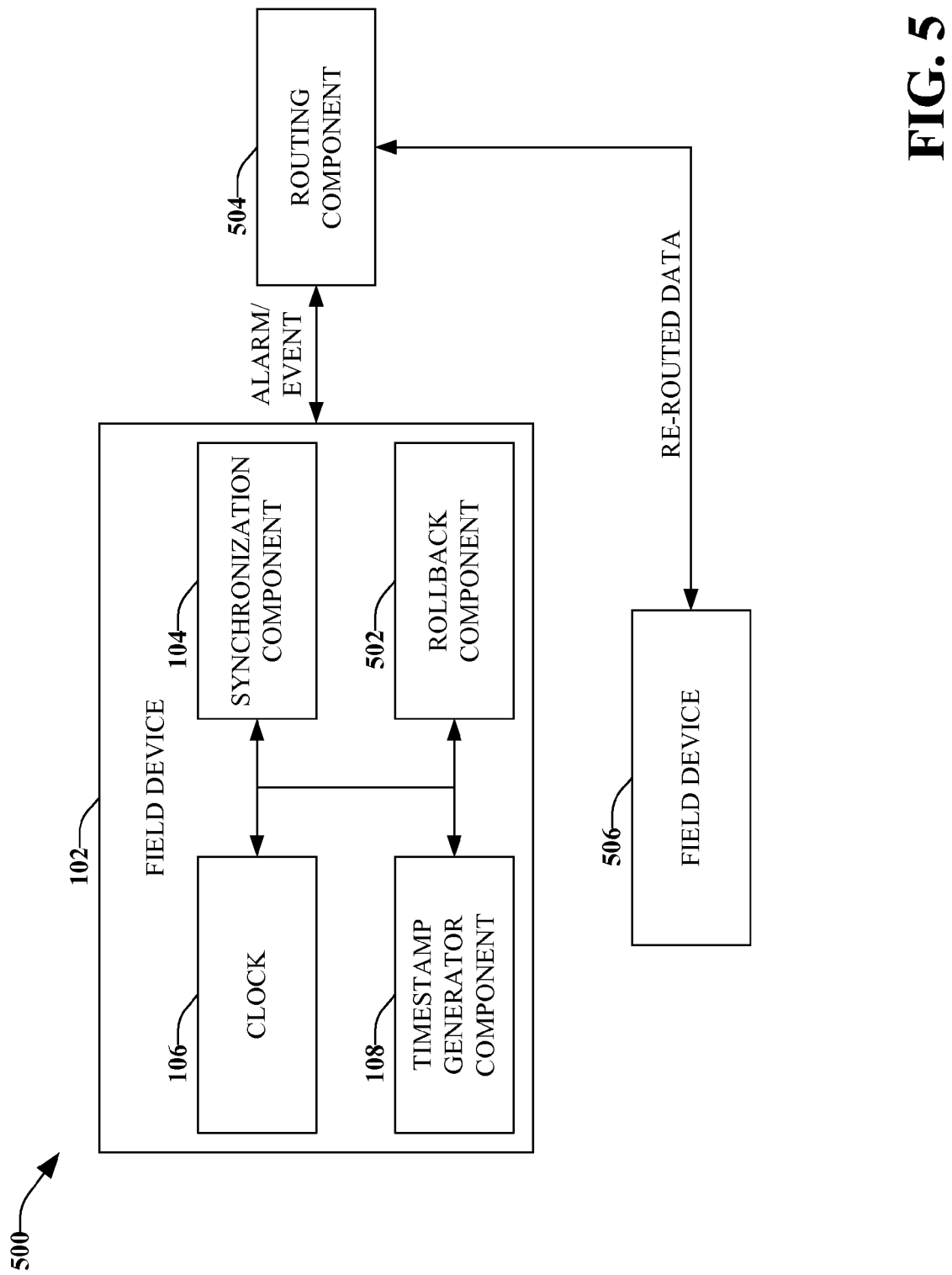
FIG. 5 illustrates a system that facilitates rolling back a manufacturing system to a known good state.

Now referring to FIG. 5, a system 500 that facilitates manufacturing a product is illustrated. The system 500 includes the field device 102, which comprises the synchronization component 104, the clock 106, and the timestamp generator component 108. Functionality of such components has been described in greater detail above. More particularly, the synchronization component 104 can synchronize the clock 106 with other clocks associated with various field devices, and the timestamp generator component 108 can create timestamps in accordance with the synchronized time. Such timestamps can be associated with alarms, thereby enabling a sequence of alarms/events from a plurality of field devices to be accurately determined.

The field device 102 additionally includes a rollback component 502, which can be utilized to roll back parameters associated with the field device 102 to a known good state. A known good state can be determined by analyzing alarms/events and timestamps associated therewith. Pursuant to an example, the field device 102 can be operating desirably until an alarm occurs. The rollback component 502 can reset a state of the field device 102 to a state existent prior to occurrence of the alarm. While shown as being internal to the field device 102, it is understood that the rollback component 502 can be utilized in a system-wide manner, such that a state of several field devices and data associated therewith can be rolled back to a known good state.

The system 500 can additionally include a routing component 504 that routes data/tasks from the field device 102 to another field device 506 upon occurrence of certain alarms. For instance, the field device 102 can generate an alarm that indicates that such field device 102 and/or a process associated therewith is disabled. The routing component 504 can receive the alarm and cause data that is destined for the field device 102 to be directed to the field device 506 (which may be substantially similar to the field device 102). Thus, a significant loss of revenue due to downtime can be avoided. The routing component 504 can also be utilized to route data to an entirely different line of field devices. For example, the field device 102 can generate an alarm (time stamped by the timestamp generator component 108), and such alarm may indicate that a production line associated with the field device 102 needs to be shut down for repair. The routing component 504 can receive such alarm, and can route data relating to the production line to a different production line that is currently not in operation. This can reduce downtime and increase output of a manufacturing facility.

Figure 6:
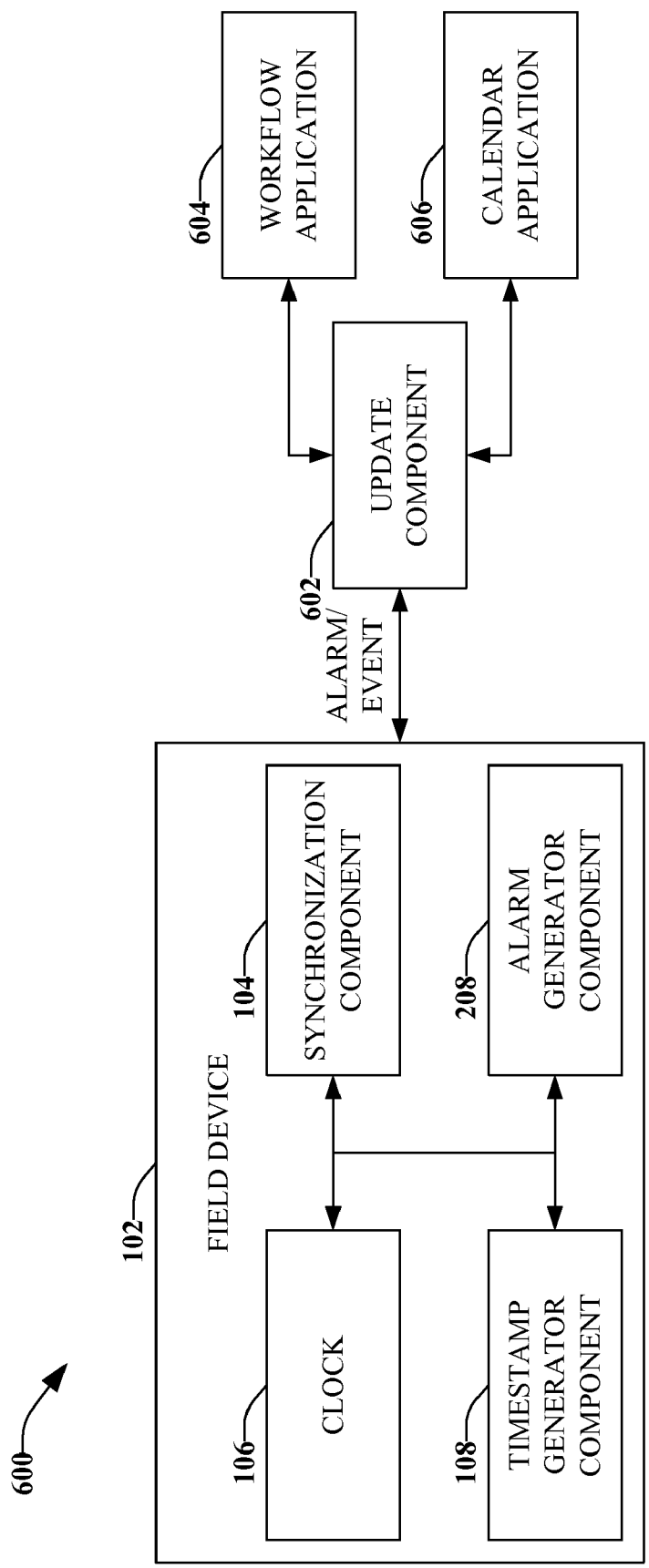
FIG. 6 illustrates a system that facilitates automatically updating one or more of a calendar application and a workflow application based at least in part upon an alarm generated by a field device.

Turning now to FIG. 6, a system 600 that enables workflow applications and/or calendar applications to be automatically updated upon receipt of an alarm created by a field device is illustrated. The system 600 includes the field device 102, which comprises the synchronization component that synchronizes the clock 106 with clocks of other field devices within an industrial environment. When the alarm generator component 208 creates alarms, such alarms can be associated with a timestamp (created by the timestamp generator component 108) that accords to a system-wide time.

The system 600 also includes an update component 602 that can receive an alarm from the field device 102 and automatically update a workflow application 604 and/or a calendar application 606. Additionally, the updating component 602 can analyze alarms/events retained within a data repository (not shown) in connection with updating the workflow application 604 and/or the calendar application 606. Pursuant to an example, in a batch application, typically an operator of the field device 102 may not need to sign off on a particular batch parameter. Given the alarm, however, the workflow application 604 can be updated to require validation from an operator regarding a particular parameter prior to initiating a process. Similarly, the calendar application 606 can be automatically updated to reflect delays associated with an alarm.

Figure 7:
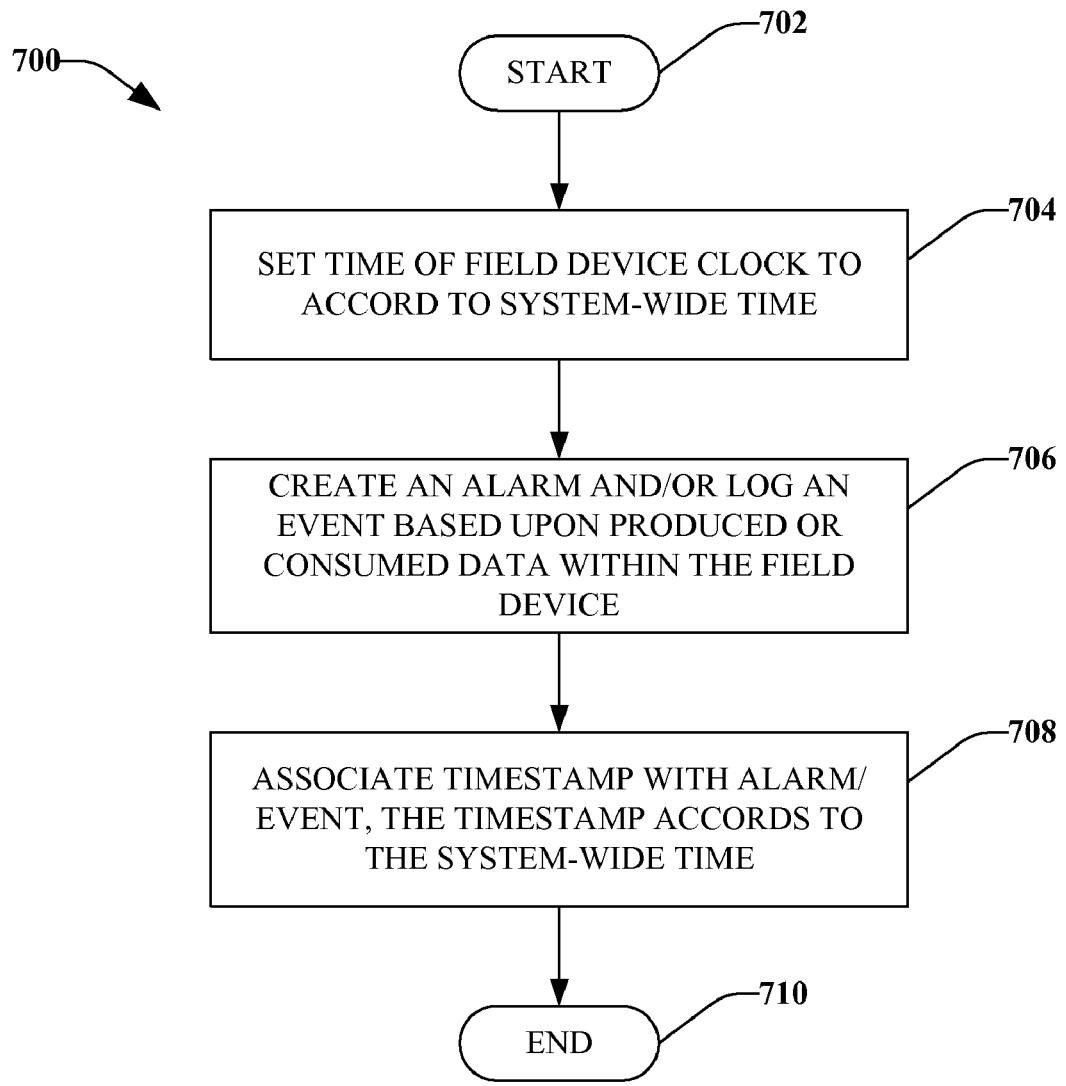
FIG. 7 is a representative flow diagram that illustrates a methodology for associating a timestamp with an alarm, wherein such association occurs within a field device that is synchronized in time with a plurality of other field devices.
Figure 8:
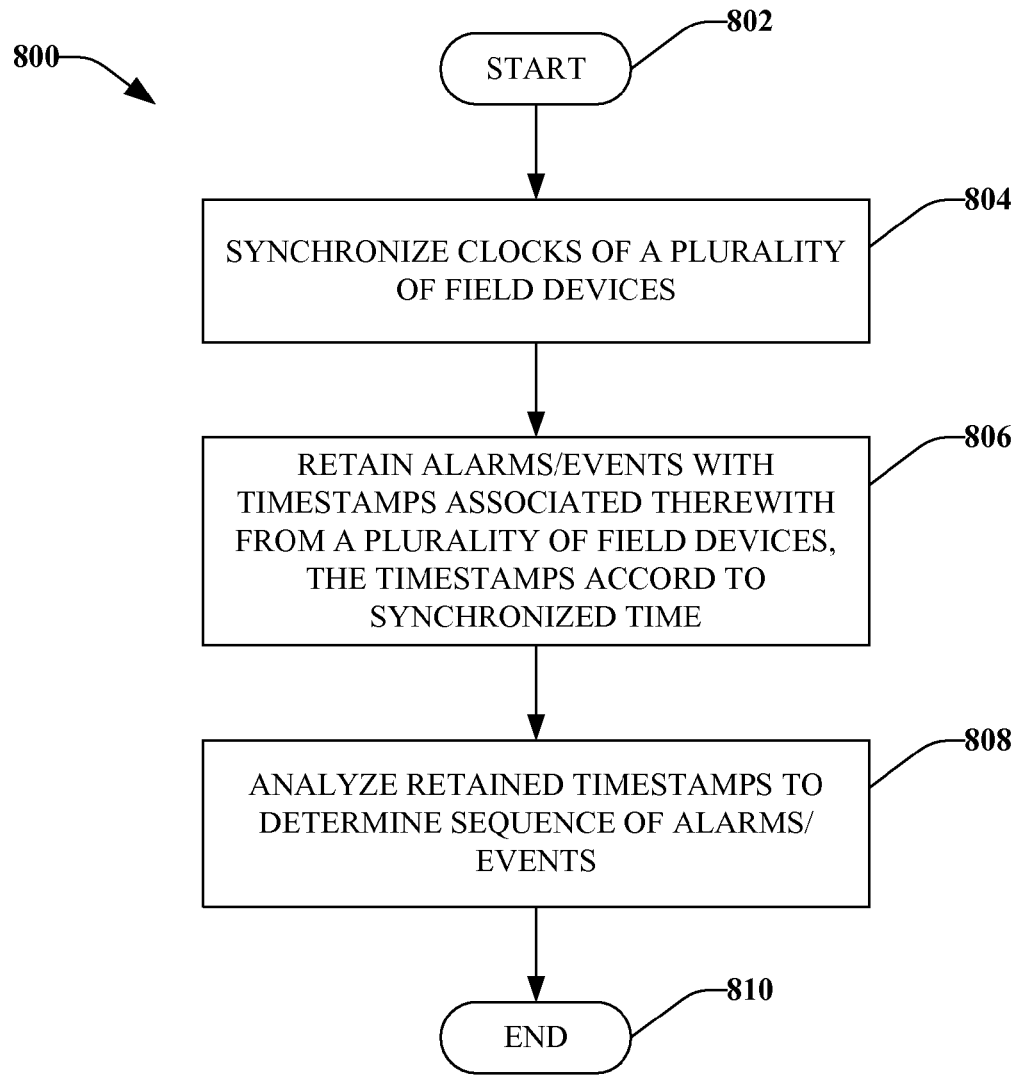
FIG. 8 is a representative flow diagram that illustrates a methodology for determining a sequence of alarms and/or events.
Figure 9:
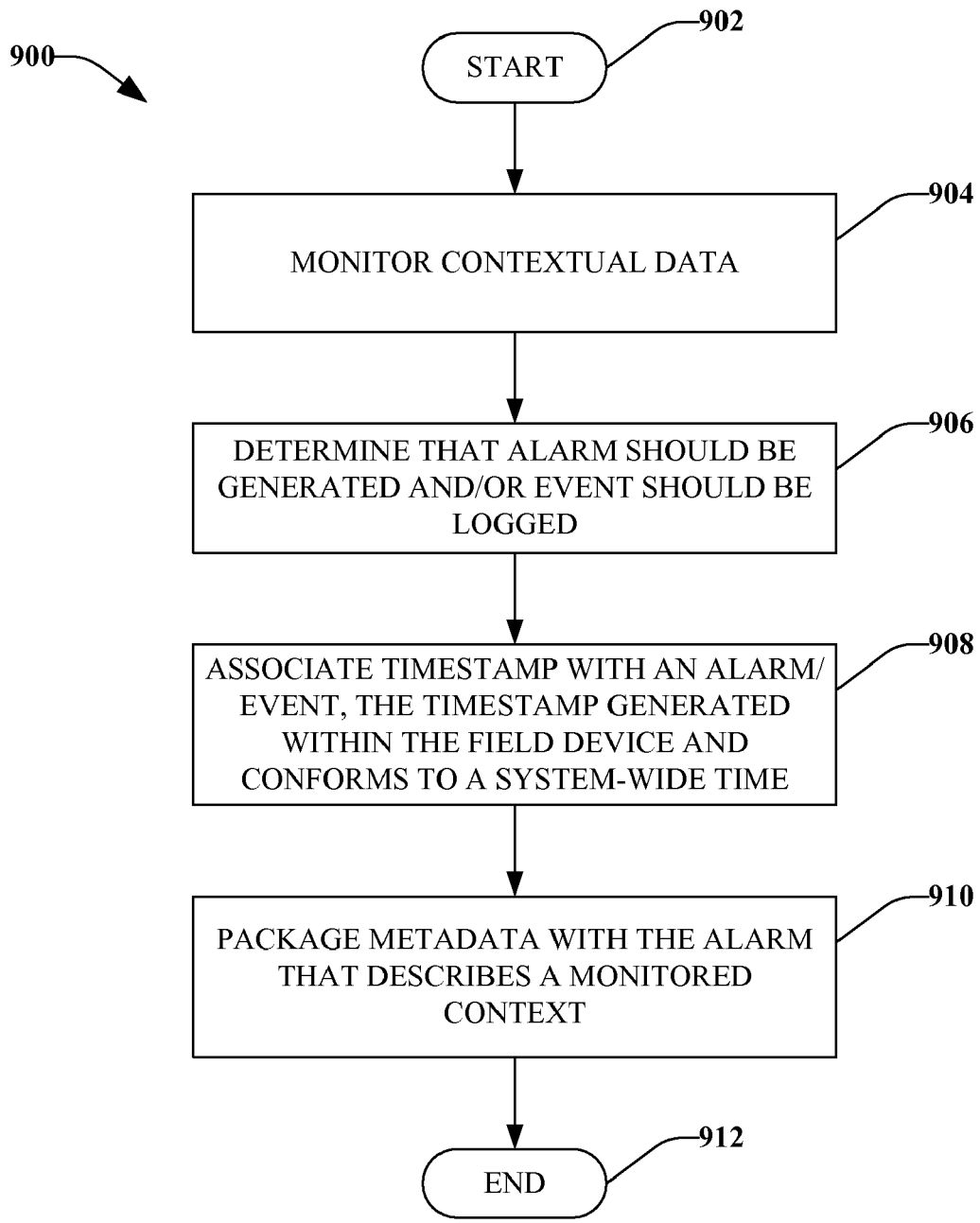
FIG. 9 is a representative flow diagram that illustrates a methodology for packaging alarms with metadata.

Turning to FIGS. 7-9, methodologies relating to generating alarms within field devices are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 7, a methodology 700 for generating an alarm within a field device is illustrated. The methodology 700 starts at 702, and at 704 a time of a field device clock is set so that it accords to a system-wide time. For instance, a master clock can provide a time, and such time can be set within a clock of a plurality of devices within an industrial system. The master clock can resend a time periodically to ensure that clocks of the field devices do not become unsynchronized.

At 706, an alarm is created and/or an event is logged based upon data that is produced or consumed by the field device. For example, the field device can be a controller and can consume temperature data from a temperature sensor. If the sensed temperature lies outside an expected range, the field device can create an alarm. Thus, alarms are created within field devices rather than at a device that is above the factory floor. At 708, a timestamp is associated with the created alarm/event, wherein the timestamp accords to the system-wide time. The timestamp can be extremely accurate, as resolution of the timestamp is not limited to how quickly timestamps can be pulled. The alarm with the associated timestamp can be provided to a data repository and aggregated with alarms/events associated with different field devices, and sequence of alarms/events can be accurately ascertained (due to field device clocks being synchronized according to a system-wide time). The methodology 700 then completes at 710.

Now referring to FIG. 8, a methodology 800 for determining a sequence of alarms/events is illustrated. The methodology 800 initiates at 802, and at 804 the clocks of a plurality of field devices are synchronized. For instance, as described above, the clocks can be synchronized through utilization of a master clock. Additionally or alternatively, a clock of a field device can act as a master clock with respect to other field devices. At 806, alarms/events from a subset of the plurality of field devices are retained, wherein timestamps associated with the alarms/events accord to the synchronized time. The alarms/events and timestamps associated therewith can be generated from within the field devices (rather than within an MES system, for instance). At 808, the retained timestamps are analyzed to determine a sequence of alarms and/or events. Such sequence can be useful when diagnosing problems within an industrial environment (e.g., locating a source of a problem). The retained alarms with associated timestamps can also be analyzed to determine trend information and other suitable information. The methodology 800 completes at 810.

With reference to FIG. 9, a methodology 900 for generating an alarm within a field device is illustrated. The methodology 900 begins at 902, and at 904 contextual data is monitored, such as state of a process, operator associated with a process, current shift, type of product being manufactured, and other suitable contextual information. At 906, a determination is made that an alarm should be generated and/or that an event should be logged. For instance, the field device can produce data, wherein such data resides outside an expected range—thus, an alarm is desirably generated. In another example, an operator can request data from the field device, thus causing generation of an event.

At 908, a timestamp is associated with the alarm/event, wherein the timestamp is generated from within the field device and conforms to a system-wide time. In other words, several field devices can generate alarms and timestamps associated therewith, wherein such field devices are synchronized with one another. The universal synchronization of field devices enables sequencing of alarms and/or events, wherein the timestamping can be accomplished at a granular level (e.g., nanoseconds) within field devices. Thus, devices in different geographic regions can be synchronized with one another, enabling recreation of a series of alarms/events that occurred in different locations in a chronologically correct order. Such sequencing can be utilized in connection with database reconciliation. Additionally, at 910, metadata can be packaged with the alarm, wherein the metadata describes contextual data monitored at 904. For instance, an alarm can be generated that includes an identity of an operator of a particular field device when the alarm occurred. Inclusion of such metadata within alarms/events enables a more robust analysis of alarms/events to determine a source of a problem and/or to make a manufacturing process more efficient. The methodology 900 then completes at 912.

Figure 10:
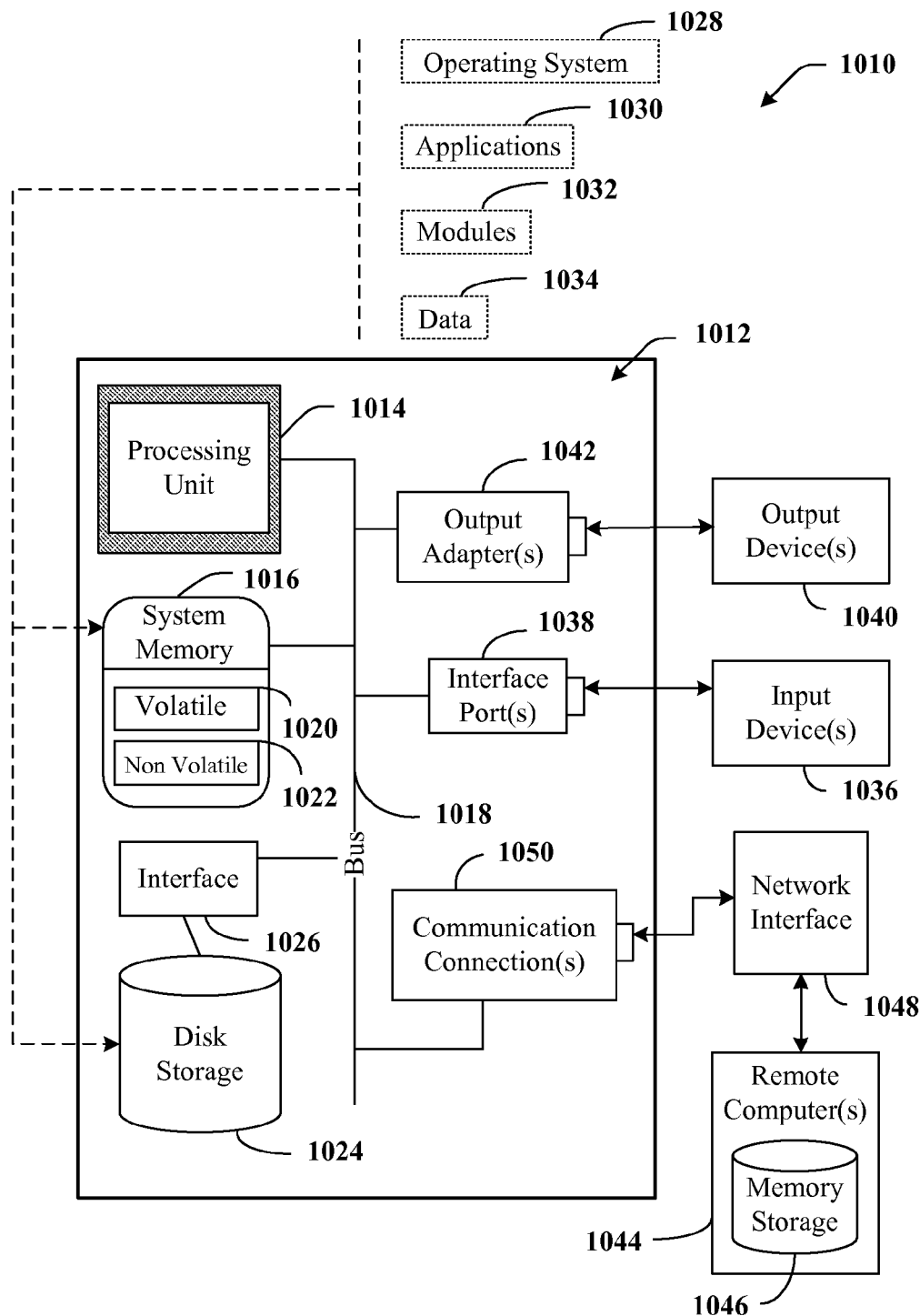
FIG. 10 is an example computing environment.

With reference to FIG. 10, an example environment 1010 for implementing various aspects of the aforementioned subject matter, including creating alarms and timestamps, includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
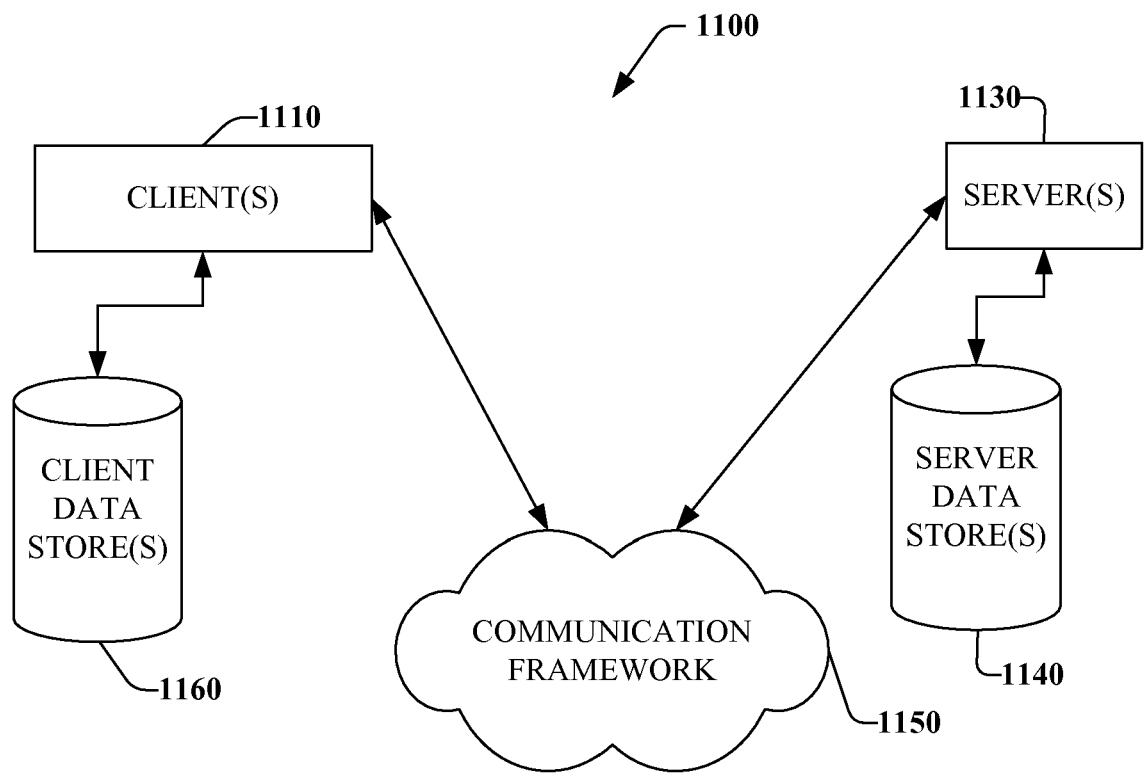
FIG. 11 is an example networking environment.

FIG. 11 is a schematic block diagram of a sample-computing environment 1100 with which the disclosed subject matter can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the subject invention, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A field device in an industrial environment, comprising:
   a clock that is synchronized with a clock of at least one other field device; and
   a timestamp generator component that creates a timestamp for at least one of an alarm or an event created within the field device, the timestamp accords to the synchronized time.

2. The field device of claim 1, further comprising a synchronization component that synchronizes the clock with a master clock.

3. The field device of claim 1, further comprising a synchronization component that synchronizes the clock with the clock of the at least one other field device.

4. The field device of claim 1 being communicatively coupled to a data repository that retains alarms and events from a plurality of field devices.

5. The field device of claim 4, the data repository is associated with an indexing component that enables the alarms and events to be chronologically sequenced.

6. The field device of claim 1, further comprising an alarm generator component that analyzes data that is one or more of produced and consumed by the field device to determine if the data is within an expected range.

7. The field device of claim 6, the alarm generator component creates an alarm if the data lies outside the expected range and associates the alarm with a timestamp created by the timestamp generator component.

8. The field device of claim 7, the alarm generator component indicates a severity of the created alarm.

9. The field device of claim 7, further comprising a context analyzer component that monitors contextual data associated with the field device, the alarm generator component packages contextual data monitored by the context analyzer component with the created alarm.

10. The field device of claim 9, the contextual data is associated with an Enterprise Resource Planning system.

11. The field device of claim 1, further comprising an event logger component that packages a logged event with a timestamp created by the timestamp generator component.

12. The field device of claim 1, further comprising a rollback component that rolls back a state of the field device to a known good state upon the field device generating an alarm.

13. The field device of claim 1, the synchronized time accords to Greenwich Mean Time.

14. The field device of claim 1 being a controller.

15. A system that facilitates analyzing alarms and/or events, comprising:
    a data repository that retains alarms and events created by a plurality of field devices, the plurality of field devices include clocks that are synchronized according to time and the alarms and events are associated with timestamps generated by the field devices; and
    an indexing component that chronologically orders the alarms and events in time.

16. The system of claim 15, further comprising a master clock that is utilized in connection with synchronizing the clocks of the plurality of field devices.

17. The system of claim 15, further comprising a routing component that routes data intended for a field device that generated an alarm to a similar field device upon occurrence of the alarm.

18. The system of claim 15, further comprising an update component that automatically updates one or more of a workflow application and a calendar application based upon an analysis of the contents of the data repository.

19. The system of claim 15, further comprising an update component that automatically updates at least one of a workflow application or a calendar application upon receipt of an alarm from one of the plurality of field devices.

20. The system of claim 15, the plurality of field devices includes at least one controller.

21. A method for generating an alarm/event, comprising:
    synchronizing a clock of a first field device with a clock of at least one other field device;
    generating one of an alarm and an event within the first field device; and
    generating a timestamp according to the synchronized time within the first field device upon generating the one of the alarm and the event; and
    associating the one of the alarm and the event with the timestamp.

22. The method of claim 21, further comprising utilizing a master clock to synchronize the clock of the first field device with the clock of the at least one other field device.

23. The method of claim 21, further comprising:
    relaying the at least one of the alarm and the event or the associated time stamp to a data repository; and
    indexing the at least one of the alarm or the event according to time amongst a plurality of other alarms.

24. The method of claim 21, further comprising universally synchronizing clocks of field devices within an industrial environment.

25. The method of claim 21, further comprising associating the at least one of the alarm or the event with metadata that describes contextual data existent when the at least one of the alarm or the event was created.

26. An industrial controller, comprising:
    means for synchronizing a clock of the industrial controller with a system-wide time;
    means for generating an alarm within the industrial controller; and
    means for associating a timestamp that conforms to the system-wide time with the generated alarm.

* * * * *